United States Patent
Colussi et al.

(10) Patent No.: US 12,545,061 B2
(45) Date of Patent: Feb. 10, 2026

(54) ROTOR WITH BREATHER AND ANTI-ROTATION ARRANGEMENT FOR TIRE CALIBRATION ARRANGEMENTS

(71) Applicant: COL-VEN S.A., Santa Fe (AR)

(72) Inventors: Primo Antonio Colussi, Santa Fe (AR); Natalio Domingo Venica, Santa Fe (AR)

(73) Assignee: COL-VEN S.A., Santa Fe (AR)

( * ) Notice: Subject to any disclaimer, the term of this patent is extended or adjusted under 35 U.S.C. 154(b) by 629 days.

(21) Appl. No.: 17/729,155

(22) Filed: Apr. 26, 2022

(65) Prior Publication Data
US 2023/0191853 A1 Jun. 22, 2023

(30) Foreign Application Priority Data
Dec. 21, 2021 (AR) .............................. P20210103605

(51) Int. Cl.
*B60C 23/00* (2006.01)

(52) U.S. Cl.
CPC .. *B60C 23/00345* (2020.05); *B60C 23/00336* (2020.05)

(58) Field of Classification Search
CPC ............ B60C 23/007; B60C 23/00327; B60C 23/00345; B60C 23/00336; B60C 23/00363
USPC ........................................................ 152/417
See application file for complete search history.

(56) References Cited

U.S. PATENT DOCUMENTS

| | | | | |
|---|---|---|---|---|
| 6,401,743 B1* | 6/2002 | Naedler | ............ | B60C 23/00318 137/224 |
| 6,698,482 B2* | 3/2004 | Hennig | ............ | B60C 23/00345 152/417 |
| 7,207,365 B2* | 4/2007 | Nelson | ............ | B60C 23/00354 152/417 |
| 2004/0155516 A1* | 8/2004 | Colussi | ............ | B60C 23/00363 301/5.24 |
| 2004/0244896 A1* | 12/2004 | Jarrett | ............... | B60C 23/00363 152/417 |
| 2005/0194079 A1* | 9/2005 | Hennig | ............ | B60C 23/00363 152/417 |
| 2016/0250901 A1* | 9/2016 | Hennig | ............ | B60C 23/00363 152/417 |
| 2019/0105952 A1* | 4/2019 | Padula | ............. | B60C 23/00354 |
| 2022/0185009 A1* | 6/2022 | Henry | ............... | B60C 23/00336 |

FOREIGN PATENT DOCUMENTS

| | | | | | |
|---|---|---|---|---|---|
| CN | 202884028 U | * | 4/2013 | ........ | B60C 23/00345 |
| KR | 20000054173 A | * | 3/2002 | ............... | G02F 1/13 |
| WO | WO-2015136005 A1 | * | 9/2015 | ............ | B60C 23/00 |
| WO | WO-2016141310 A1 | * | 9/2016 | ........... | B60B 35/003 |

* cited by examiner

*Primary Examiner* — S. Joseph Morano
*Assistant Examiner* — Eva L Comino
(74) *Attorney, Agent, or Firm* — Joseph R. Englander, Esq.; Lewis Brisbois Bisgaard & Smith LLP

(57) ABSTRACT

Rotor with breather and anti-rotation arrangement for tire calibration arrangements that provides a suitable breather of the axle hub, and, in turn, an improved oil retention thus preventing the premature wear of internal pieces and possible accidents during its operation.

10 Claims, 7 Drawing Sheets

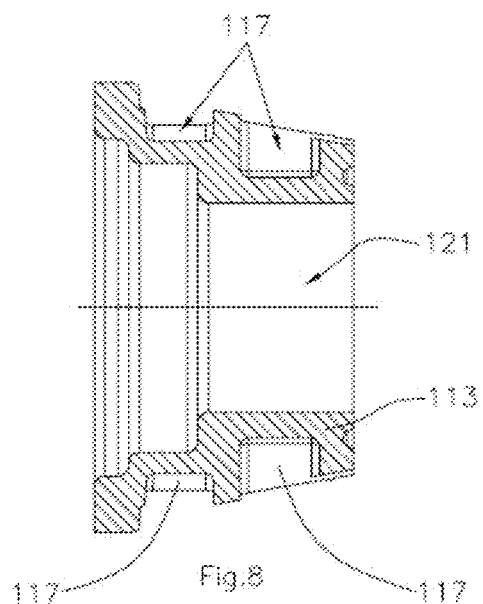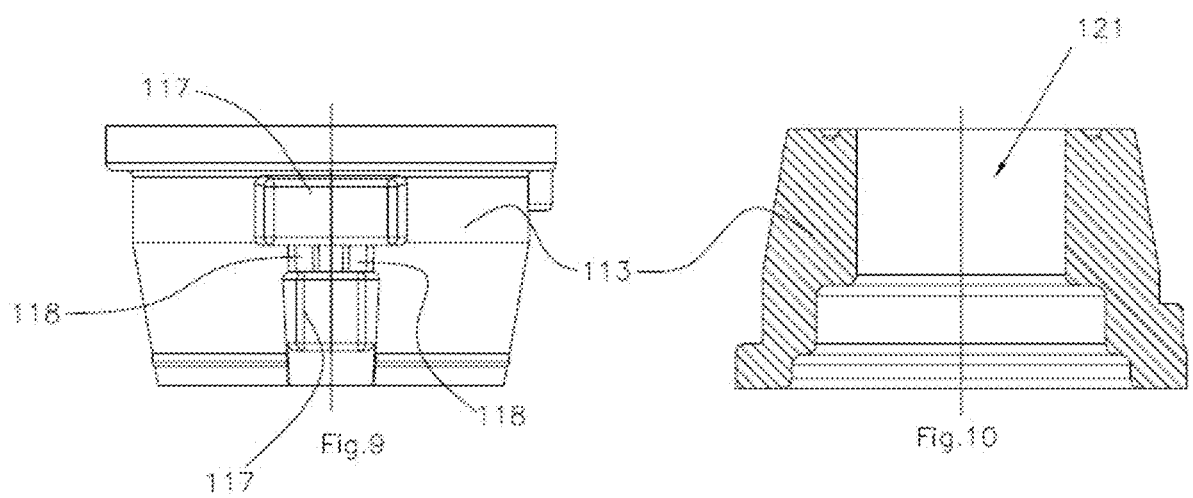

ROTOR WITH BREATHER AND ANTI-ROTATION ARRANGEMENT FOR TIRE CALIBRATION ARRANGEMENTS

CROSS REFERENCE OF RELATED APPLICATIONS

This application is a Utility patent application claiming priority of Argentine patent application no. P 20210103605 filed on Dec. 21, 2021.

STATE OF THE ART OF THE INVENTION

Field of the Invention

This invention is directed to pressure control, regulation and calibration equipment in a tire pressure arrangement and, more particularly, this invention relates to a rotor for said tire calibration arrangements, wherein said rotor is made up and built to provide an improved axle hub breather and, in turn, an improved oil retention thus avoiding the premature wear of internal pieces and accidents during its operation.

Prior Art Description

The tire pressure control, regulation and maintenance in a vehicle are of the utmost importance in the cargo or passenger transport in order to allow for a safe trip without interruptions or accidents. There exist numerous arrangements designed for the maintenance, reduction or increase of the tire pressure, either in motion or at rest, which are commonly named central tire inflation-deflation systems. The application thereof may be in a wide variety of vehicles. The vehicles most commonly equipped with these kinds of systems are heavy vehicles of passenger or cargo transport such as short, medium and long distance buses, trucks, cargo transport trailers, etc.

Tire inflation-deflation systems usually comprise an outer air compressor connected by means of respective pipes and tubes to the wheel inflation valves, and, in turn, there are also control means or equipment to detect the pressure lack or excess within the tires and send the corresponding signals to compensate the pressure within the tires. It is to be noted that inflation or deflation systems such as those described in Argentine Patent AR037242 are well known in the state of the art and, consequently, they shall not be further described herein.

Likewise, the axles of cargo or transport vehicles equipped with these systems may be hollow with axle ends commonly having a through-hole. The hollow axle provides an advantageous duct to supply air pressure to the wheel end through respective pipes. Between the axles and the tires or wheels, there are valves that allow for inflation or deflation (AR Patent AR037242) and before them, there are rotary couplings to be mounted on the vehicle wheels.

Said rotary couplings may be those couplings disclosed in the Argentine Patent AR037242B1 which is herein incorporated by reference. According to FIG. 1 related to the prior art and, more particularly, to FIG. 8 of Ar Patent AR037242, there is a rotary coupling 25 having a block 37 firmly mounted on an adjustable support 35 and which are together rotatably mounted on an axle 49 by means of respective rolling bearings 47. Likewise, a fixed nut or locking nut 75 and a plurality of O-ring seals are provided. Inside said axle 49, an air duct 51 is provided and outside the axle 49, a hose 71 that runs along and inside a hollow axle 1 is connected as illustrated in FIG. 2, which also relates to the prior art.

On the other hand, the rotary coupling 25 also has a cover 53 mounted on said block 37 and a cylindrical head 62 between said axle 49 and the interior of an end section of said block 37, operatively held by a spring 58. Said cylindrical head 62 has in its interior a duct that coincides with the air duct 51 thus allowing for the passage of pressurized air from the hose 71 towards a transfer chamber 45 through which the air is ejected towards the respective pipes 2 connected to the wheel inflation valves 3.

If there is clearance in the wheel 3, the axle 49 will move "outwards" as well as "inwards" so that the pressurized air leaks outwards (interior of the hollow axle 1). The "inward" movement causes wear that generates an opening 66 between the axle tip 49 and the head 62. While in case the axle 49 moves "outwards", it will move until finding a hole 77. In both cases, the pressurized air escapes or leaks through said opening 66 and hole 77, which are in communication with a vent opening 65 communicated with the interior of the hollow axle 1. Thus, the pressurized air leaking into the hollow axle 1 continues moving towards the vent tube "J" that allows for the discharge of the pressurized air to the exterior. Both the tube "J" and the hose 71 are connected to a coupling (not shown) mounted on a portion of the hollow axle 1. If the hose 71 is "pinched", the pressurized air leaks directly through the interior of the hollow axle 1 towards said tube "J".

Although this system has proved to work in practice, there has always existed the need of providing constant oil or grease retention and axle hub breather that make it possible to compensate the internal pressure variations and avoid accidents that may jeopardize the safety of the vehicle during its journey. Likewise, the conventional prior art systems do not provide a suitable hub oil or grease retention since they do not have a bearing designed for said purpose, and the compression spring 58 after an operative period of time usually rotates and sweeps the surfaces with which it has contact and, consequently, it usually causes breakages or the wear of pieces thus generating air leakages.

By virtue of the current state of the art related to tire inflation or deflation systems and, more particularly, rotary couplings, it would be convenient to have a new arrangement that allows for a more suitable continuous breather and, in turn, avoids the leakage or transfer of oil or grease from the interior of the hub to the exterior.

BRIEF DESCRIPTION OF THE INVENTION

It is then an object of this invention to provide a new rotor for tire calibration arrangements that allows for a suitable breather of the axle hub.

It is still an object of this invention to provide a rotor that eliminates the use of the tube "J" thus turning the breather of the axle hub more efficient.

It is still another object of this invention to provide a rotor that suitably retains the hub oil or grease while preventing possible accidents and spillage.

It is a further object of this invention to provide a rotor that avoids sweeping the rotor parts due to the stress caused by the spring rotation thus preventing the wear of pieces and air leakage.

It is a further object of this invention to provide a rotor with breather for tire calibration arrangements of the type comprising a block rotatably mounted on an axle that has an internal air duct or passage in communication, by means of an internal end, with a pressurized air hose or pipe that is inside a hollow axle or pressurizes the axle interior and carries pressurized air from an external air reservoir or tank, and, in turn, said internal air duct or passage is in communication, by means of an external end, with a transfer chamber operatively communicated with respective tire inflation-deflation valves through corresponding pipes, and at least one bearing is rotatably mounted on said axle by means of at least one rolling bearing, and said block is in turn mounted on said bearing so that it rotates together with said axle to which it is fixed; and wherein said bearing also comprises a pair of oil traps on its periphery and between which a pair of breather guide channels is defined, said breather channels allowing for communication and the guided passage of pressurized air to the exterior through a breather passage or hole defined in a middle portion of said block.

It is still a further object of this invention to provide a rotor with an anti-rotation arrangement for tire calibration arrangements of the type comprising a block rotatably mounted on an axle that has an internal air duct or passage in communication, by means of an internal end, with a pressurized air hose or pipe that is inside a hollow axle and that carries the pressurized air from an external air reservoir or tank, and, in turn, said internal air duct or passage is in communication, by means of an external end, with a transfer chamber that is operatively communicated with respective tire inflation-deflation valves through corresponding pipes, and at least one anti-rotation arrangement is housed in an external part of the rotor wherein said transfer chamber is and wherein spring is held between an internal wall of said external part of the block and an end of said axle is located, and said anti-rotation arrangement having: at least one anti-rotation seat on which a first end of said spring seats; at least one anti-rotation guide wherein the other end of said spring seats; at least one solid seal housed in said anti-rotation guide, and which is kept airtight between said spring and said axle end; and at least one O-ring seal located between said anti-rotation guide and said solid seal.

BRIEF DESCRIPTION OF THE DRAWINGS

For the purpose of providing more clarity and a better understanding of the subject-matter of the invention, the invention has been illustrated in several figures, in which the invention has been represented by way of example in one of the preferred embodiments thereof wherein:

FIG. 8 shows a side view of a B-B section of the bearing of FIG. 7;

FIG. 9 shows a top view of the bearing of FIG. 6;

FIG. 10 shows a bottom view of an A-A section of the bearing of FIG. 7;

DETAILED DESCRIPTION OF THE INVENTION

By making reference now to the figures, it may be seen that this invention relates to a new rotor with breather and anti-rotation arrangement for tire calibration arrangements that provides a suitable breather of the axle hub and, in turn, an improved oil retention thus preventing the premature wear of the internal pieces and possible accidents during its operation.

Figure 1:
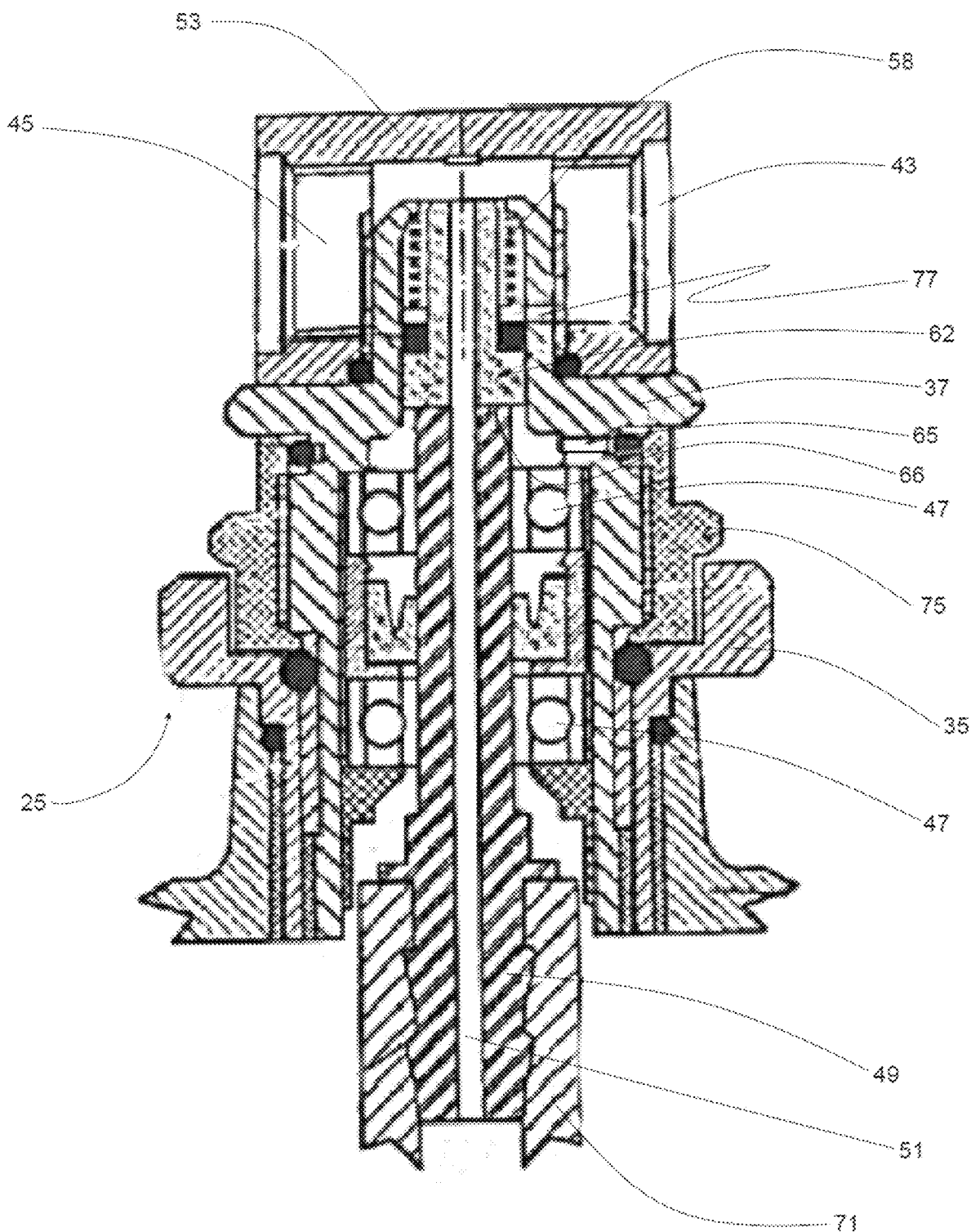
FIG. 1 shows a sectional view of a rotary coupling according to the prior art.
Figure 2:
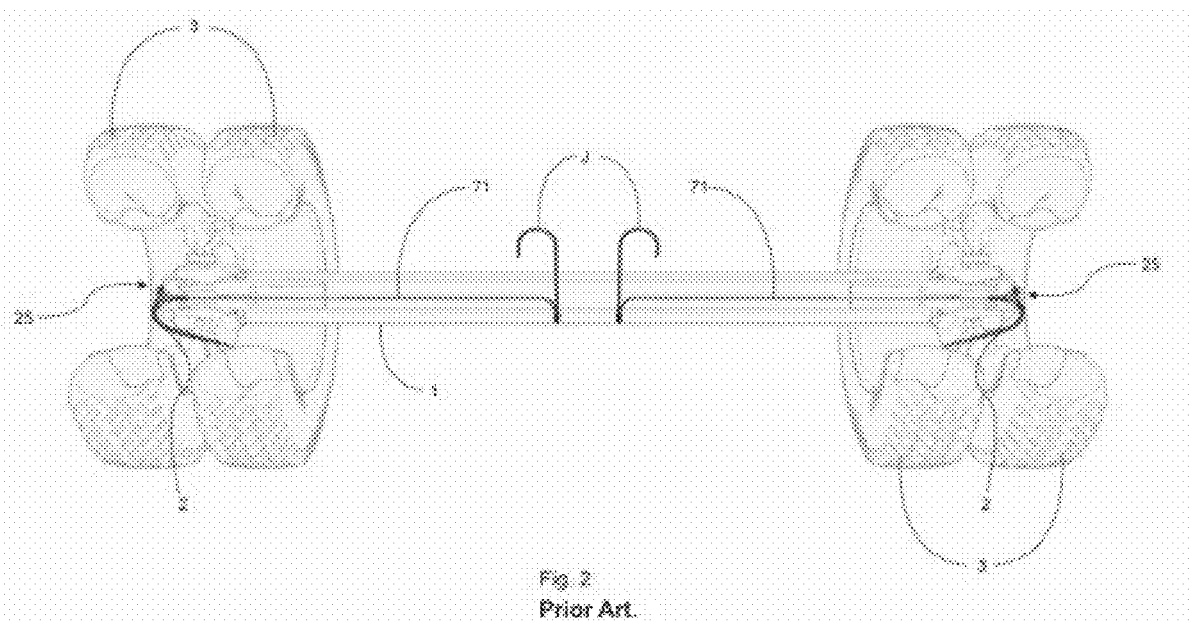
FIG. 2 shows a sectional view of a part of a tire calibration arrangement according to the prior art, wherein the conventional arrangement for the pressurized air breather and discharge to the exterior by means of a tube "J" may be seen.
Figure 3:
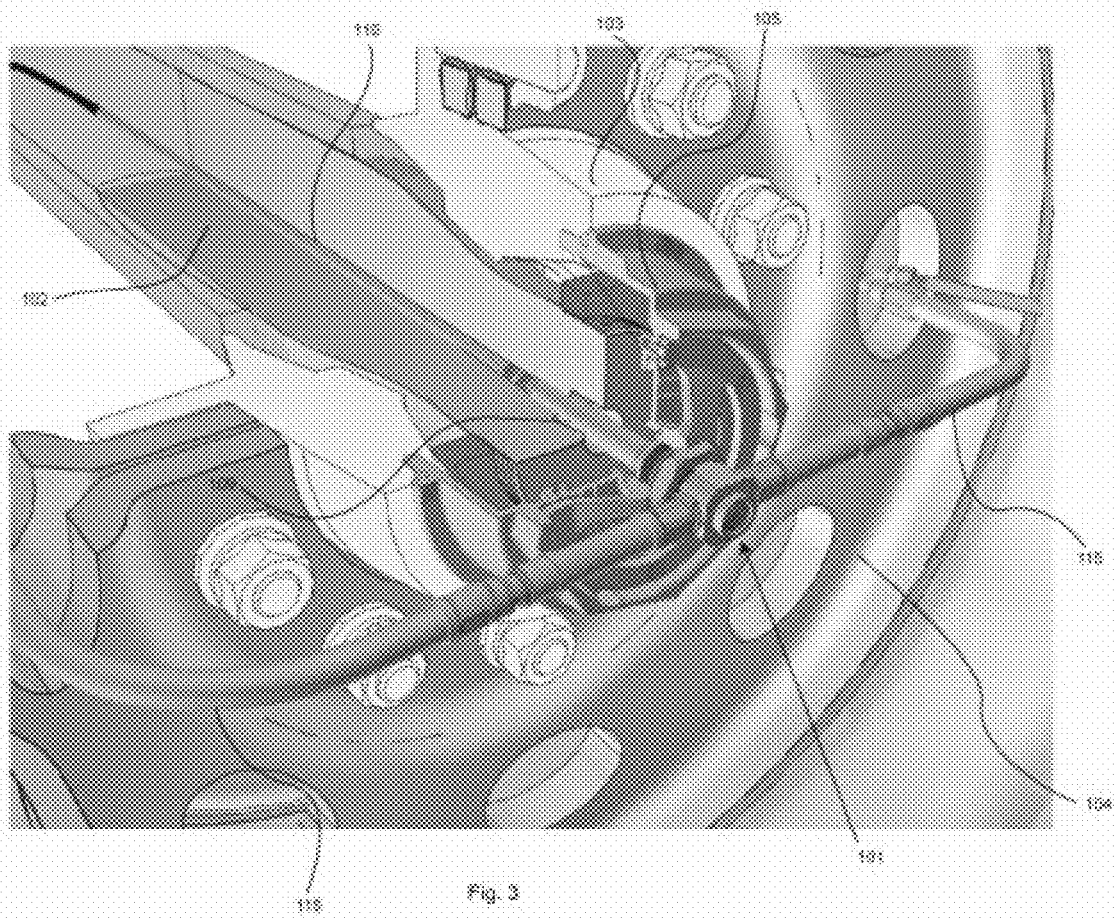
FIG. 3 shows a partial perspective view of the rotor of the invention mounted on an end of a wheel axle.
Figure 4:
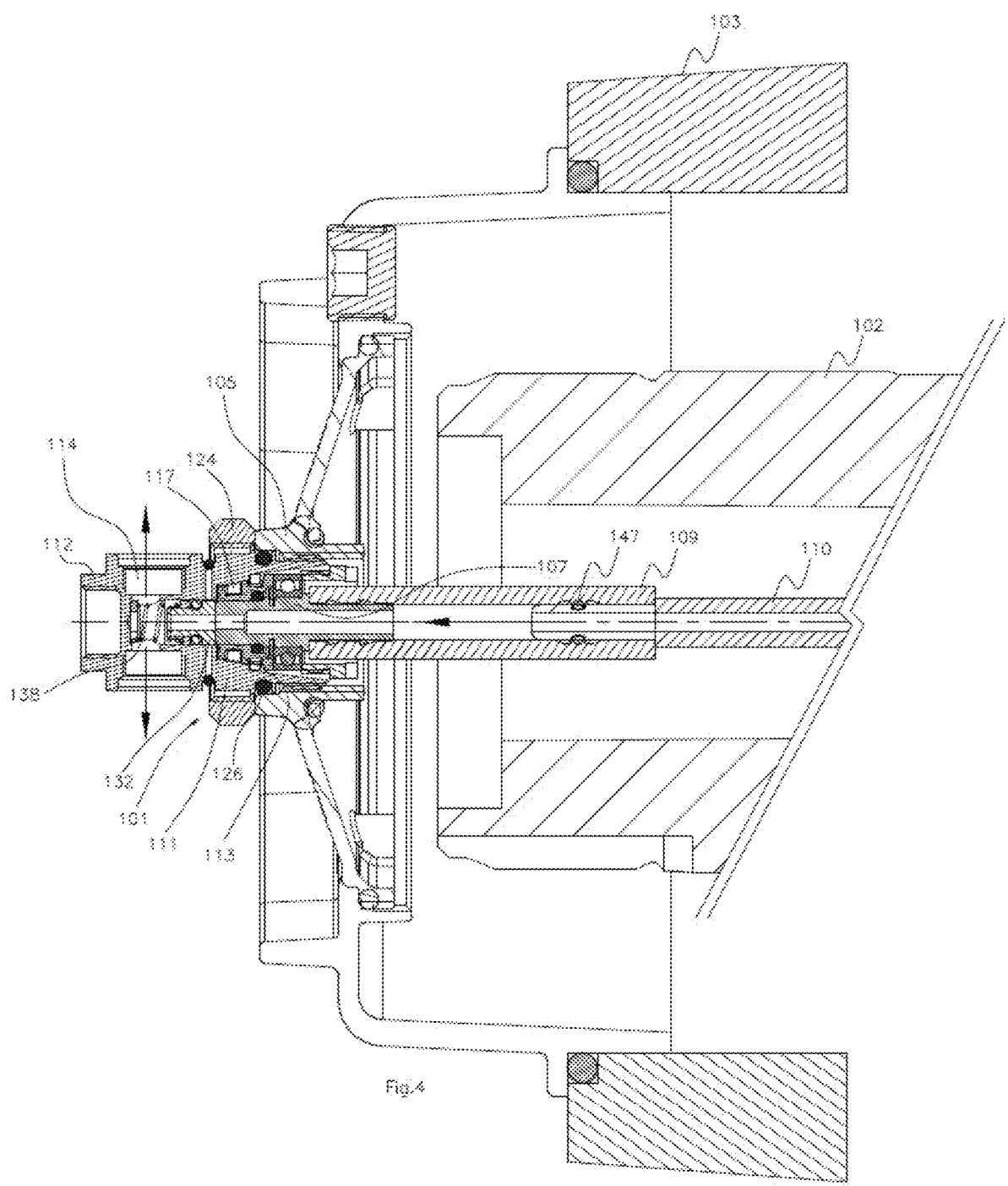
FIG. 4 shows a partial sectional view of the rotor according to this invention.

It is in this way and according to FIGS. 3 to 14 that the rotor of this invention is indicated by means of the general reference 101 and the same as the conventional rotors of the prior art, it is mounted on an end of a hollow axle 102 wherein there is a hub 103 for mounting a wheel 104 as best illustrated in FIG. 3. The rotor 101 of the invention is mounted on said hub 103 by means of a supporting cover 105 as best illustrated in FIGS. 3 and 4.

Figure 5:
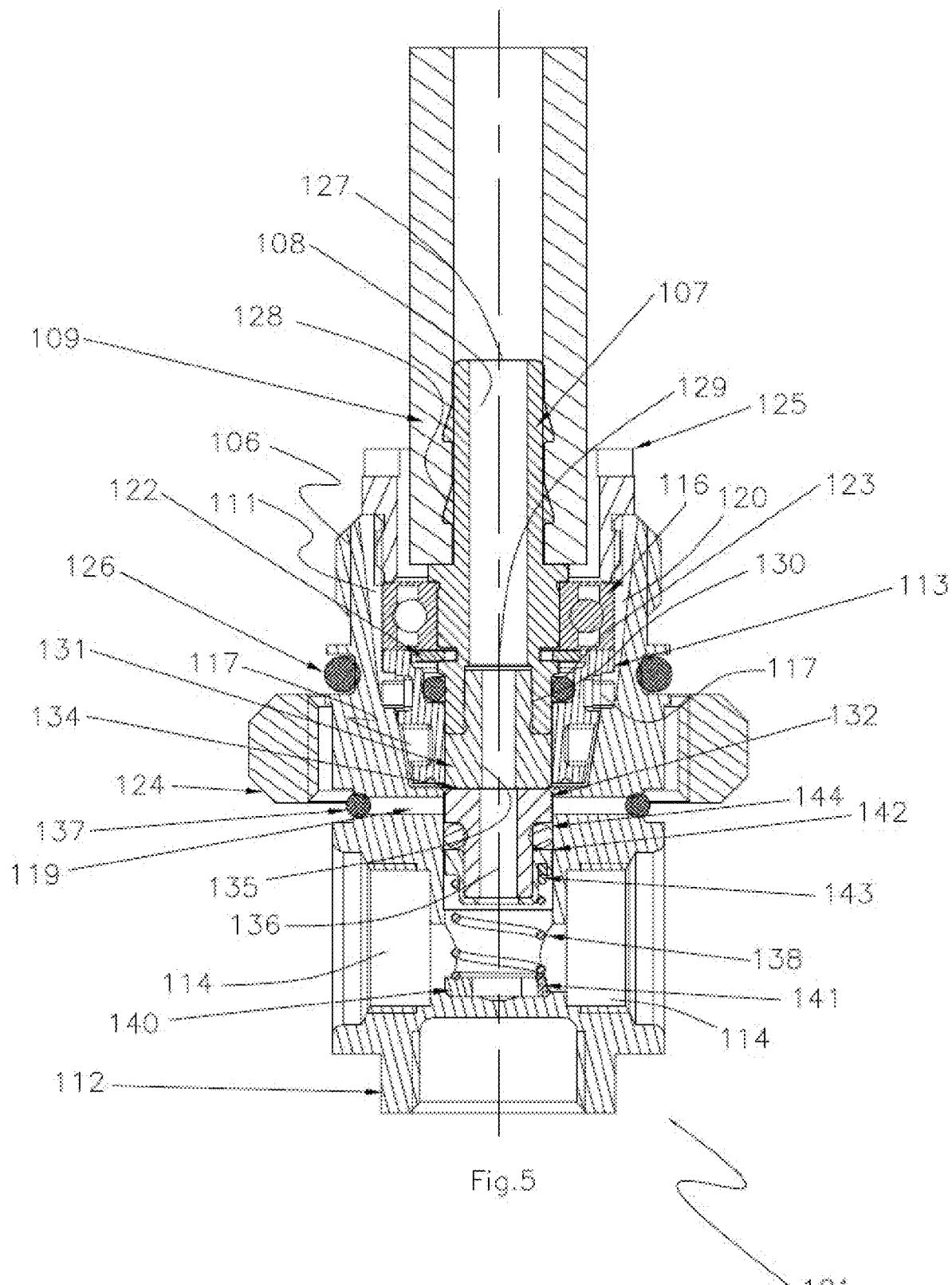
FIG. 5 shows a sectional view of the rotor of the invention.
Figure 6:
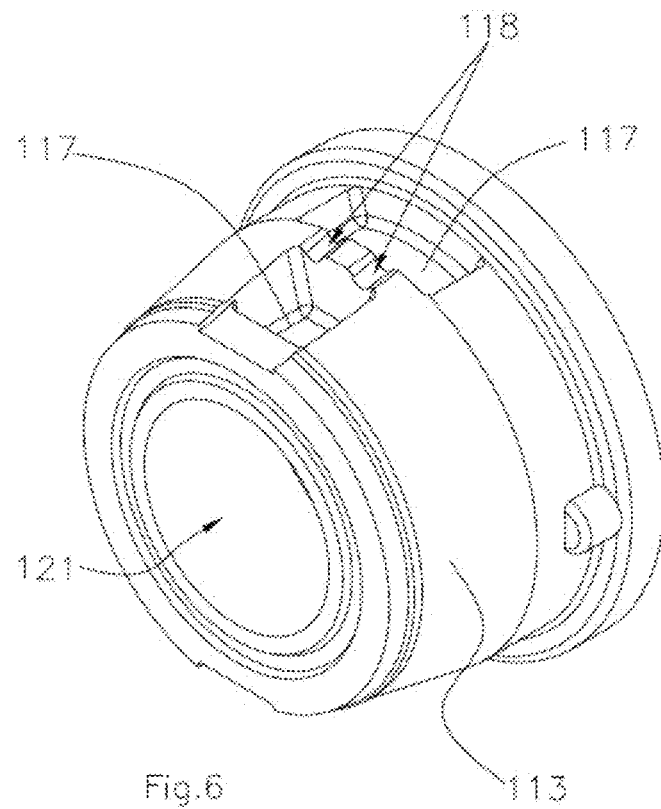
FIG. 6 shows a perspective view of a rotor bearing and according to this invention.
Figure 7:
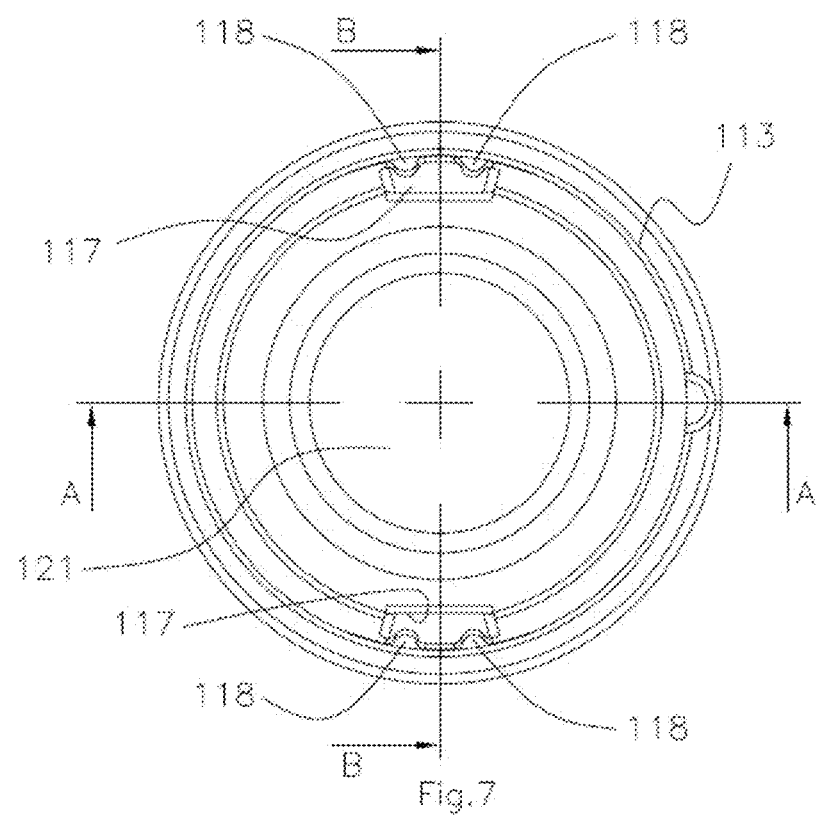
FIG. 7 shows a front view of the bearing of FIG. 6.
Figure 11:
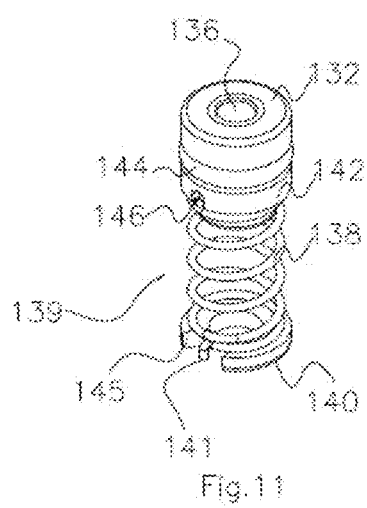
FIG. 11 shows a perspective view of a spring anti-rotation arrangement according to this invention.
Figure 12:
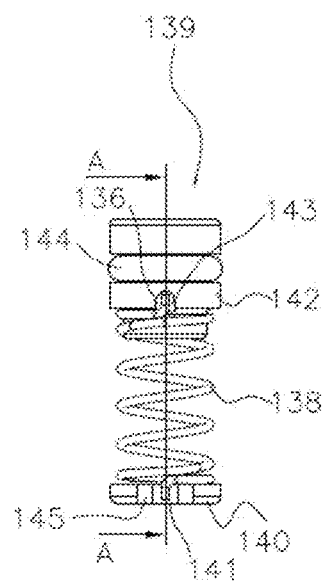
FIG. 12 shows a front view of the spring anti-rotation arrangement of FIG. 11.
Figure 13:
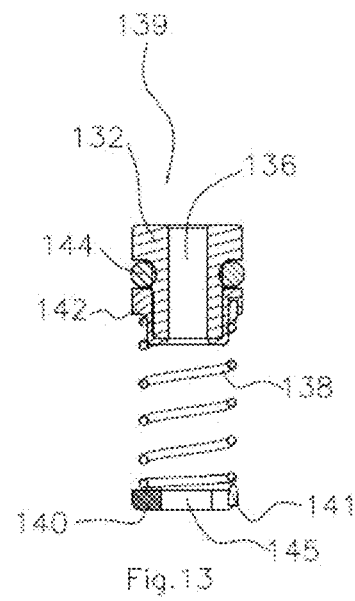
FIG. 13 shows a sectional view A-A of the spring anti-rotation arrangement of FIG. 12.
Figure 14:
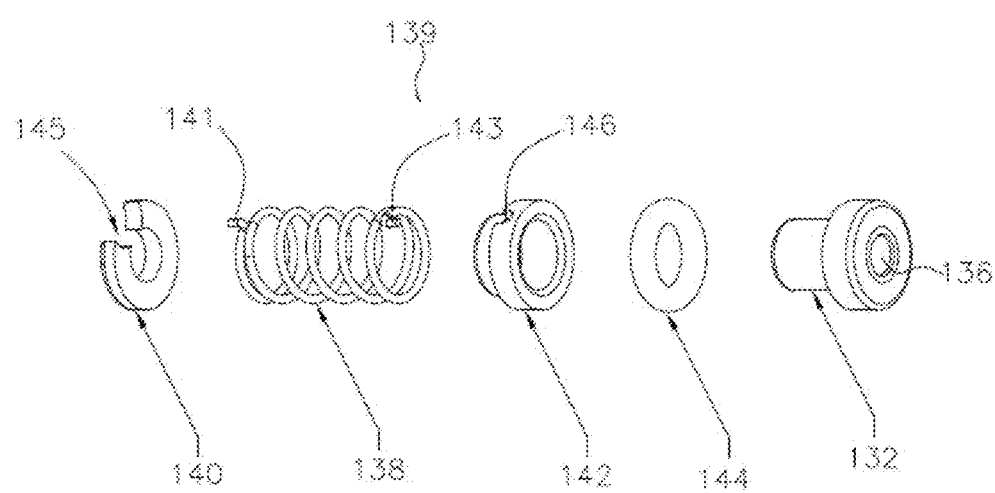
FIG. 14 shows an exploded view of the spring anti-rotation arrangement of FIG. 11.

According to FIGS. 4 and 5, the rotor 101 comprises a block 106 rotatably mounted on an axle 107 that has an internal air duct or passage 108 in communication, by means of an internal end and more particularly a connector 109, with a pressurized air hose or pipe 110 that is inside said hollow axle 102 and that carries the pressurized air from an external air reservoir or tank. It is to be noted that the rotor 101 of this invention is not limited to said hollow axles provided with pressurized air pipes, since it may be considered and used also with pressurized axles. That is to say that the rotor of the invention may be used in pressurized or non-pressurized axles without any problem. As far as said block 106 is concerned, it comprises an internal part 111 and an external part 112. The internal part 111 is rotatably mounted on said axle 107 by means of a bearing 113, while the external part 112 comprises a transfer chamber 114 in communication with an external end of said internal air passage 108 of the axle 107, so that through said transfer chamber 114 the air is ejected towards respective inflation or deflation valves (Patent AR AR037242) through corresponding pipes 115 in order to generate the tire inflation or deflation.

It is clarified that even when reference has been made to inflation/deflation valves, it is to be highlighted that the invention may be interchangeably used with the valves used in the vehicle running gear at the rotor outlet, that is to say either inflation valves only or inflation/deflation valves.

With reference now to the bearing 113, it is rotatably mounted on said axle 107 by means of a rolling bearing 116. Likewise, said internal part 111 of block 106 is mounted on said bearing 113 so as to rotate together with said axle 107 that is in a fixed or steady position. As it may be seen in FIGS. 4 and 5, and more particularly in FIGS. 6 to 10, the bearing 113 of this invention comprises a conical geometry, but this feature is not limitative for this invention, and a pair of oil traps 117 on its periphery and between which there is a pair of breather guide channels 118 that allow for communication and the guided passage of pressurized air to the exterior through a breather passage or hole 119 defined in a middle portion of said block 106, more particularly between said internal part 111 and external part 112.

It is highlighted that the internal geometry of the internal part 111 of the block 106 comprises a conical shape that is complementary to the conical shape of the bearing 113 in order to provide a portion in close contact between the block 111 and the bearing 113, and a portion with a clearance that allows for the air passage. That is to say that when the hose 110, or connector 109 or the connection between both of them by means of the O-ring 147 carrying the pressurized air is pinched, the air within the hollow axle 102 flows through passages 120 defined by the clearance between said bearing 113 and the internal part 111 of block 106. Thus, instead of being evacuated through the tube "J" as in the prior art, the air, according to this invention, flows through said passages 120, breather guide channels 118 and, finally, leaves said breather passage or hole 119.

In this way, a more suitable hub breather is maintained in case a puncture or pressurized air leakage occurs. Likewise, by means of the oil traps 117 in the form of cavities, an improved retention of the hub oil or grease is achieved thus preventing possible leakages that may cause problems. It is to be noted that said bearing 113 has an internal passage 121 with several internal steps in order to form a seat and good contact when said axle 107 is mounted.

Furthermore, among said bearing 113, rolling bearing 116 and axle 107, there are at least one safety catch 122 housed in a peripheral groove made in said axle 107, at least one O-ring seal 123 between said bearing 113 and said axle 107, said O-ring seal 123 housed in a seat defined by a step of said axle 107 and the internal step of said bearing 113. Likewise, a locking nut 124 that is threaded on an end of the external part of said internal part 111 of block 106 and a nut 125 threaded on the other end of said internal part 111 of block 106, and an O-ring seal 126 housed in an exterior portion of said internal part 111 of block 106, which serves as a seal against said supporting cover 105, are provided.

Moreover, said axle 107 has a first end or internal end 127 which portion is provided with a plurality of teeth 128 that allow for the fit connection with said connector 109, and a second end or external end 129 that defines a seat 130 for a terminal or insert 131 in contact with a solid seal 132 provided on the external part 112 of block 106. It is highlighted that said contact between the terminal or insert 131 and said solid seal 132 defines a terminal sealing surface-seal 134. Both the terminal 131 and the solid seal 132 have an internal passage 135 and 136, respectively, in communication with said internal air duct or passage 108 of axle 107 and with said transfer chamber 114. Likewise, between said internal part 111 and external part 112 of block 106, an O-ring seal 137 is provided.

With reference now to the solid seal 132, FIG. 5, and more particularly FIGS. 11 to 14, it is kept airtight between said terminal or insert 131 and a spring 138. It is to be reminded that in the rotary couplings of the prior art, the spring is mounted only between said solid seal or cylindrical head and an internal part of the block. This feature causes the wear of pieces since the spring rotates together with the rotary coupling. When the displacement of the axle occurs, the force exerted on the spring makes the spring rotate with such a force that it begins to sweep the internal surface of the block or the cylindrical head thus causing cracks and consequent problems. In order to prevent the spring from rotating and sweeping the internal surfaces, this invention provides an anti-rotation arrangement 139 in the external part 112 of block 106 and, more particularly, it is used to prevent the spring 138 rotation. The anti-rotation arrangement 139 comprises at least one anti-rotation seat 140 on which a first end 141 of said spring 138 seas, at least one anti-rotation guide 142 on which the other end 143 of said spring 138 seas, and at least one O-ring seal 144 between said anti-rotation guide 142 and said solid seal 132. As it may be seen in FIG. 13, a part of said solid seal 132 is housed in said anti-rotation guide 142, thus generating a sealed bond or contact between parts by means of said O-ring seal 144.

It is to be noted that in order to prevent the spring 138 from rotating or "leaving" the anti-rotation arrangement, it has on each end 141-143 a protrusion parallel to the geometrical longitudinal axle thereof, and, in turn, said anti-rotation seat 140 has a groove 145 wherein said protruding end 141 of spring 138 fits; and said anti-rotation guide 142 has a hole 146 wherein the other protruding end 143 of said spring 138 fits.

Accordingly, said solid ring 132 is kept airtight between said spring and said axle end, more particularly and after the preceding description, the solid seal is now kept airtight between said terminal or insert 131 and said anti-rotation arrangement 139 containing the spring 138 thus preventing the rotation thereof and, consequently, preventing the latter from damaging the internal surfaces of the external part 112 of block 106, thus preventing air leakages that may jeopardize the functionality of said parts. Likewise, the solid seal 132 is kept airtight without the need of any fixation by any additional element due to the pressure differences generated between the transfer chamber and the interior of the hollow axle, and which, consequently, keep it hermetic. It is highlighted that all of the end of axle 107, the terminal 131, solid seal 132 and anti-rotation arrangement 139 are made of an antioxidant material, and the surfaces thereof may be polished to allow for an improved sealing among parts and so that no oxidation occurs due to the wet air from the unit reservoirs.

It is in this way that the rotor of this invention is made up and built and the rotor provides an improved hub 103 breather thus avoiding the use of tubes "J" thanks to the air breather passages/holes/channels 120, 119, 118 generated between the bearing 113 and block 106, retaining the oil in a better way due to the arrangement of oil traps 117 and, in turn, preventing the rotor 101 from being damaged as a consequence of the spring 138 rotation with the use of the spring anti-rotation arrangement 139.

By means of the bearing 113 the oil passage from the axle hub interior to the exterior through breather holes 119 that are exclusively designed for the breather is avoided. The bearing 113 design allows to retain oil by means of traps 117 that have a design in the form of cavities that are in communication by means of breather guide channels 118, and returns the oil again to the hub through passages 120 defined between the block 106 and the bearing 113, while also allowing for the axle hub breath through the breather holes towards the exterior. The breather holes 119 are protected against the admission of particles by means of the O-ring seal 137 that is housed between the internal part 111 and the external part 112 of block 106. It is to be highlighted that said O-ring seal 137 expands due to the air pressure thus enabling the air to escape to the exterior.

As it may be seen, in view of its novel construction features, the rotor of this invention is of universal use since it may be used both for oil hubs and grease hubs, as well as in pressurized or non-pressurized axles. Likewise, the rotor of this invention may be used with inflation/deflation valves or the like without any problem.

The invention claimed is:

1. A rotor with breather for tire calibration arrangements characterized by a block rotatably mounted on an axle having an internal air duct or passage that is in communication, by means of an internal end, with a pressurized air hose or pipe that is inside a hollow axle or pressurizes the axle interior and carries the pressurized air from an external air reservoir or tank, and, in turn, said internal air duct or passage is in communication, by means of an external end of said axle, with a transfer chamber operatively communicated with respective tire inflation or deflation valves through corresponding pipes, said rotor comprising:
   at least one bearing mounted inside said block and rotatably mounted, together with said block, around said axle by means of at least one rolling bearing; and said bearing further comprising a pair of oil traps on a periphery of the bearing, and a pair of breather guide channels being defined within each respective oil trap of the pair of oil traps, said pair of breather guide channels allowing for the communication and guided passage of pressurized air to an outside of the rotor through one of a breather passage or hole defined in a middle portion of said block.

2. The rotor for tire calibration arrangements according to claim 1, wherein said bearing has a conical geometry.

3. The rotor for tire calibration arrangements according to claim 1 further comprising a safety catch housed in a peripheral groove in said axle, the safety catch being disposed in at least one of the bearing, the rolling bearing and the axle.

4. The rotor for tire calibration arrangements according to claim 3, further comprising an O-ring seal housed on a seat defined by a step of said axle, and said O-ring seal being disposed in at least one of the bearing and the axle.

5. The rotor for tire calibration arrangements according to claim 1, wherein any one of the preceding claims, wherein said block has an internal part and an external part, the internal part being mounted on said bearing and has an internal conical geometry, and the external part is provided with said transfer chamber, one of said breather passage or hole being defined between said internal part and said external parts and further comprising an O-ring seal is provided between said internal part and said external part.

6. The rotor for tire calibration arrangements according to claim 5, comprising a threaded locking nut disposed on an end of the external part of said internal part of the block, a threaded nut disposed on an other end of said internal part of the block, and a second O-ring seal housed in an external part of said internal part of the block; and
   at least one spring mounted internally to an external part of the block, said at least one spring being held between an internal wall of said block and at least one solid seal that is operatively airtight formed between said spring and the external end of said axle.

7. The rotor for tire calibration arrangements according to claim 6, wherein said solid seal comprises an internal passage in communication with one of said internal air duct and said passage of the axle and with said transfer chamber.

8. A rotor with an anti-rotation arrangement for tire calibration arrangements characterized by a block rotatably mounted on an axle having an internal air duct or passage in communication, by means of an internal end, with a pressurized air hose or pipe that is inside a hollow axle and carries pressurized air from an external air reservoir or tank and, in turn, said internal air duct or passage is in communication, by means of an external end of said axle, with a transfer chamber that is operatively communicated with respective tire inflation or deflation valves through corresponding pipes, wherein said block comprises an internal part and an external part, and the rotor comprising at least one anti-rotation arrangement housed in said external part of the block; a spring held between an internal wall of the external part of the block and an end of said axle, wherein said anti-rotation arrangement comprises:
   at least one anti-rotation seat wherein a first end of said spring sits at said at least one anti rotation seat;
   at least one anti-rotation guide, the other end of said spring sits at said at least one anti rotation guide;
   at least one solid seal housed in said anti-rotation guide and kept airtight between said spring and said end of said axle; and
   at least one O-ring seal formed between said anti-rotation guide and said solid seal.

9. The rotor for tire calibration arrangements according to claim 8, wherein said solid seal comprises an internal passage in communication with said internal air duct or passage of the axle and with said transfer chamber.

10. The rotor for tire calibration arrangements according to claim 8, wherein:
    said spring has on each end thereof a protrusion parallel to a geometrical longitudinal axle thereof;
    said anti-rotation seat having a groove in which one of said spring protruding ends fits; and
    said anti-rotation guide having a hole in which the other protruding end of said spring fits.

* * * * *